US009109707B2

(12) United States Patent
Goulding (10) Patent No.: US 9,109,707 B2
(45) Date of Patent: Aug. 18, 2015

(54) SEAL ASSEMBLY (75) Inventor: Nigel S. Goulding, Lynchburg, VA (US)

(73) Assignee: Parker-Hannifin Corporation, Cleveland, OH (US)

( * ) Notice: Subject to any disclaimer, the term of this patent is extended or adjusted under 35 U.S.C. 154(b) by 624 days.

(21) Appl. No.: 13/502,383

(22) PCT Filed: Sep. 23, 2010

(86) PCT No.: PCT/US2010/049900
§ 371 (c)(1),
(2), (4) Date: Apr. 17, 2012

(87) PCT Pub. No.: WO2011/049705
PCT Pub. Date: Apr. 28, 2011

(65) Prior Publication Data
US 2012/0200047 A1    Aug. 9, 2012

Related U.S. Application Data (60) Provisional application No. 61/252,850, filed on Oct. 19, 2009.

(51) Int. Cl.
*F16K 7/12*    (2006.01)
*F16J 15/10*    (2006.01)

(52) U.S. Cl.
CPC ... *F16K 7/12* (2013.01); *F16J 15/10* (2013.01)

(58) Field of Classification Search
CPC ........................................................ F16K 7/12
USPC ..... 251/331, 335.2; 92/98 R, 103 R; 277/654
See application file for complete search history.

(56) References Cited

U.S. PATENT DOCUMENTS 1,800,157 A * 4/1931 Saunders ...................... 251/331
1,836,976 A * 12/1931 Krause ......................... 251/331
(Continued)

FOREIGN PATENT DOCUMENTS

AT        16698     6/1972
GB      1267920     3/1972
(Continued)

OTHER PUBLICATIONS

Notification of Transmittal of The International Search Report and The Written Opinion of the International Searching Authority, or the Declaration dated Dec. 13, 2010 in corresponding International Application No. PCT/U52010/049900.

*Primary Examiner* — John Bastianelli
(74) *Attorney, Agent, or Firm* — Renner, Otto, Boisselle & Sklar, LLP (57) ABSTRACT A seal assembly 10 includes an attachment stud 11, a reinforcing mesh 12, a rigid carrier 13, an elastomeric body 14, and an elastomeric film 15, each having a longitudinal axis 16. The carrier 13 includes an inner peripheral surface 31 defining a central opening 33 and an outer peripheral surface 32. A lateral surface 35 of the carrier 13 extends between the peripheral surfaces. Corner towers 38 and intermediate towers 39 are arranged along the outer peripheral surface 32. The towers are spaced apart by openings 40 and terminate in control surfaces 41. The body 14 includes a stationary portion 47 generally aligned with the carrier 13 and a diaphragm portion 48 generally aligned with the opening 33. The film 15 extends over and is bonded to the body portion 14 and the towers 38, 39 to provide a smooth uninterrupted chemically resistant surface for the seal assembly 10.

27 Claims, 8 Drawing Sheets

(56) References Cited

U.S. PATENT DOCUMENTS

| | | | |
|---|---|---|---|
| 2,302,930 A * | 11/1942 | Anderson | 251/331 |
| 2,710,629 A | 6/1955 | Price | |
| 2,918,089 A * | 12/1959 | McFarland, Jr. | 251/331 |
| 2,947,325 A * | 8/1960 | McFarland, Jr. | 92/103 R |
| 3,130,954 A * | 4/1964 | McFarland, Jr. | 251/331 |
| 3,134,571 A * | 5/1964 | Boteler | 92/103 R |
| 3,154,286 A * | 10/1964 | McFarland, Jr. | 251/331 |
| 3,181,990 A * | 5/1965 | Reiling | 251/331 |
| 3,310,279 A * | 3/1967 | Boteler | 251/331 |
| 3,918,495 A | 11/1975 | Abrahams | |
| 4,070,004 A | 1/1978 | Friswell | |
| 4,180,096 A | 12/1979 | Johnson | |
| D268,049 S * | 2/1983 | Ueda | D23/248 |
| 5,681,048 A | 10/1997 | Tronel | |
| 6,047,953 A * | 4/2000 | Jacob, Jr. | 92/98 R |
| 7,243,903 B2 | 7/2007 | Wincek | |
| 2006/0162547 A1 | 7/2006 | Muller | |
| 2010/0012868 A1* | 1/2010 | Lodolo | 251/366 |

FOREIGN PATENT DOCUMENTS

| | | |
|---|---|---|
| GB | 2212598 | 7/1989 |
| GB | 2399616 | 9/2004 |
| WO | 2007/001835 A1 | 1/2007 |

* cited by examiner

SEAL ASSEMBLY

CROSS REFERENCE TO RELATED APPLICATIONS

The present application claims the benefit of the filing date of U.S. Provisional Patent Application Ser. No. 61/252,850 filed Oct. 19, 2009, the disclosure of which is incorporated herein by reference in its entirety.

TECHNICAL FIELD

This invention relates generally to seal assemblies. More particularly, this invention relates to a diaphragm seal assembly for use in a fluid control valve.

BACKGROUND OF THE INVENTION

Diaphragm seal assemblies are widely used in fluid control valves to control the flow of a wide variety of fluids through the valve at various conditions of temperature, pressure and other conditions. Such diaphragm seal assemblies typically include an elastomeric body. A stationary peripheral portion of the elastomeric body may be secured to a housing of the fluid control valve, and a diaphragm portion of the elastomeric body may be carried by the stationary peripheral portion for movement between a closed or sealed position and an opened position.

The elastomeric body of such diaphragm seal assemblies may be exposed to relatively harsh conditions of fluid composition, fluid temperature and/or fluid pressure. The elastomeric body exposed to such conditions may be cycled between its closed and opened positions frequently, over extended periods of time. Also, the elastomeric body may be exposed to steam or other cleaning agents, during periodic cleaning or when the type of fluid flowing through the valve is changed. Still further, the elastomeric body may be exposed to variable tightening forces and to extrusion forces during installation and use.

Diaphragm seal assemblies used in fluid control valves may be considered wear items that may be serviced or replaced at periodic intervals or upon condition requirements. If the diaphragm seal assembly requires relatively more frequent service (such as tightening or replacement), this may cause relatively greater expenses to be incurred for labor, parts, and possible down time for the system in which the fluid control valve is used. Accordingly, it is desirable to provide a diaphragm seal assembly that is relatively inert with respect to the fluid flowing through the fluid control valve, that is relatively maintenance free, that does not leak either between the fluid ports of the fluid control valve or externally of the fluid control valve, that does not crack or rupture or otherwise operationally degrade over prolonged cycles and periods of time, that resists extrusion during installation and use, and that may be installed relatively quickly without retightening or other maintenance after installation.

One common type of fluid control valve in which diaphragm seal assemblies may be used is a weir fluid control valve. Weir fluid control valves typically include a valve body that includes a fluid inlet port, a fluid outlet port, and a weir interposed between the inlet and outlet ports. A diaphragm seal assembly in such valves may move toward the weir to close the fluid flow between the fluid ports and away from the weir to open the fluid flow. Diaphragm seal assemblies used in weir fluid control valves may be used in a wide variety of applications, including pharmaceutical processing applications, food and beverage processing applications, and other applications in which safety, accuracy, dependability, replacement ease, and long life are important.

SUMMARY OF THE INVENTION

This invention provides a seal assembly, and more particularly, a seal assembly for use in fluid control valves. Still more particularly, this invention provides a diaphragm seal assembly for use in fluid control valves to control the flow of a wide variety of fluids through the valve at various conditions of temperature, pressure and other conditions.

The seal assembly according to a preferred embodiment of this invention may include a rigid carrier, an elastomeric body, and an elastomeric film. The carrier, the body and the film each may have a longitudinal axis and may each be coaxial with one another. The carrier may minimize extrusion of the body, minimize over compression or under compression of the body, and minimize leakage resulting from compression set of the elastomeric components of the seal assembly. The body may be a thermosetting material with favorable compression set characteristics that maintains effective sealing force over time. The film may be a thermoplastic film that is bonded to the body and to control surfaces of the carrier to provide a chemical resistant continuous film that extends over the surface of the body and carrier.

The carrier may include an outer peripheral surface facing outwardly from the longitudinal axis and an inner peripheral surface facing inwardly toward the longitudinal axis and defining a central opening extending longitudinally through the carrier. A lateral carrier surface of the carrier may face longitudinally in a first longitudinal direction and extend laterally between the outer peripheral surface and the inner peripheral surface. A plurality of towers on the carrier may each extend longitudinally in the first direction from the lateral carrier surface. The towers may terminate at a lateral control surface that faces longitudinally in the first direction.

The elastomeric body may include a stationary portion and a diaphragm portion. The stationary portion may be generally laterally coextensive with the lateral carrier surface between the inner peripheral surface and the outer peripheral surface. The diaphragm portion may be generally laterally coextensive with the opening. The body may have a working surface facing in the first longitudinal direction, and the film may be adhered to and generally laterally coextensive with the body working surface. The towers may control compression of the body during assembly and use, and compression of the body may cause the body to resiliently maintain the chemically resistant film toward a sealing position.

The towers may be arranged in spaced apart relationship substantially adjacent the outer peripheral surface of the carrier. The carrier may also include a plurality of longitudinally extending through holes that are arranged between the inner peripheral surface and the outer peripheral surface to receive assembly bolts. Some of the towers may be arranged laterally outwardly of the bolt holes.

The carrier lateral surface of the preferred embodiment may also include laterally extending openings between adjacent ones of the towers. The stationary portion of the elastomeric body may extend into the openings and may be discontinuous at the location of each of said towers. The film may cover the tower lateral control surfaces, as well as the elastomeric body, to provide a smooth continuous uninterrupted working surface for the seal assembly.

According to the preferred embodiment, the body may be a thermosetting material and the film may be a thermoplastic material. The thickness of the film measured in a direction perpendicular to the film working surface is substantially uniform at all locations at which the film is adhered to the body, and this thickness is in the range of about 0.010 inch to 0.040 inch. To minimize any effect of the film on the function of the carrier control surfaces, the thickness of the film measured in a direction perpendicular to the film working surface is also substantially uniform at the location at which said film covers the control surfaces, and this thickness of the film at the location at which the film covers the control surfaces is substantially less than the thickness of the film at the locations at which the film is adhered to the body.

Further according to the preferred embodiment of the invention, the body includes a continuous seal bead substantially at the location of and substantially aligned with the inner peripheral surface. An attachment stud includes an enlarged diameter head portion, and the head portion is substantially embedded in the diaphragm portion of the body at the location of the longitudinal axis. A reinforcing web may be embedded in the diaphragm portion of the body longitudinally aligned with the head, and the head may be longitudinally intermediate the reinforcing web and the working surface of the body.

The invention also provides various ones of the additional features and structures and methods described in the claims set out below, alone and in combination, which claims are incorporated by reference in this summary of the invention.

BRIEF DESCRIPTION OF THE DRAWINGS

Embodiments of this invention will now be described in further detail with reference to the accompanying drawings, in which.

DETAILED DESCRIPTION OF THE INVENTION

The principles, embodiments and operation of the present invention are shown in the accompanying drawings and described in detail herein. These drawings and this description are not to be construed as being limited to the particular illustrative forms of the invention disclosed. It will thus become apparent to those skilled in the art that various modifications of the embodiments herein can be made without departing from the spirit or scope of the invention.

Figure 1:
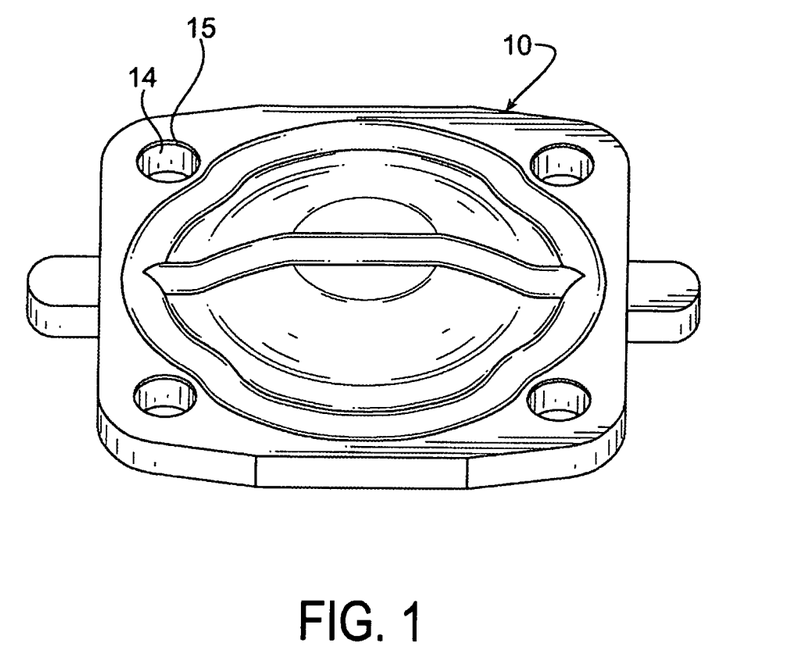
FIG. 1 is a perspective view of a seal assembly according to one preferred embodiment of this invention.
Figure 2:
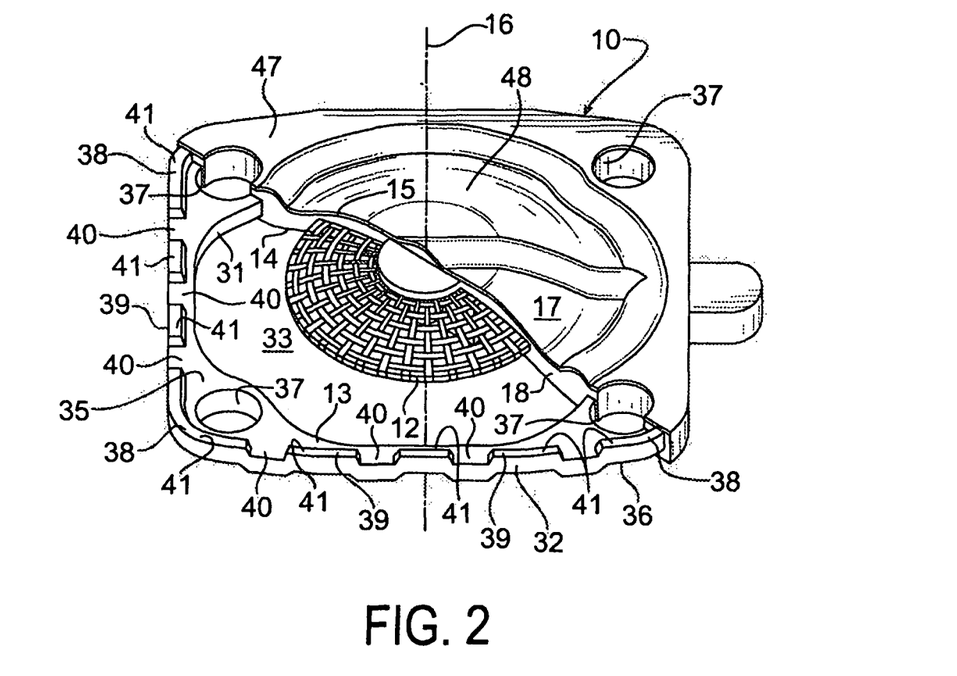
FIG. 2 is partial cross sectional perspective view of the seal assembly shown in FIG. 1.
Figure 3:
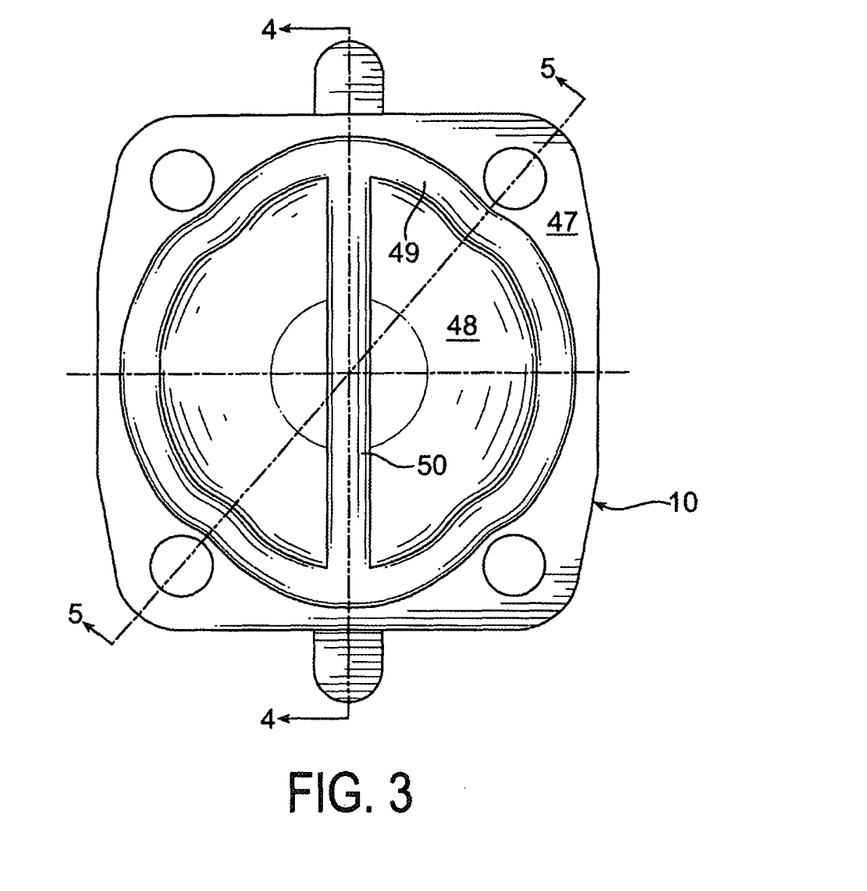
FIG. 3 is a top plan view of the seal assembly shown in FIG. 1.
Figure 4:
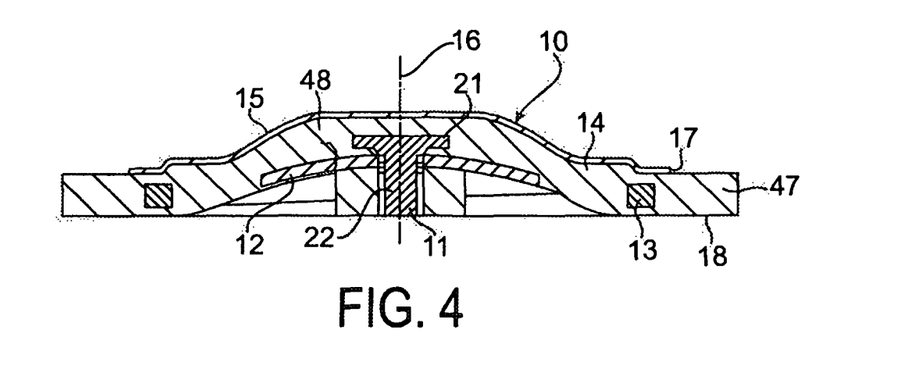
FIG. 4 is a cross sectional view taken along reference view line 4-4 in FIG. 3.

Referring now to FIGS. 1 and 2, a diaphragm seal assembly 10 according to one preferred embodiment of this invention is illustrated. The diaphragm seal assembly 10 includes an attachment stud 11, a reinforcing mesh 12, a rigid carrier 13, an elastomeric body 14, and an elastomeric film 15. The attachment stud 11, reinforcing mesh 12, rigid carrier 13, elastomeric body 14 and elastomeric film 15 are each coaxially arranged about a longitudinal axis 16. As also further described below, the diaphragm seal assembly 10 includes a working side 17 that faces in a first longitudinal direction. A portion of the working side 17, as further described below, is exposed to the controlled fluid flowing through the fluid control valve. The diaphragm seal assembly 10 further includes a back side 18 that faces in a second longitudinal direction opposite the first direction. The back side 18 of the diaphragm seal assembly 10 is not exposed to the fluid flowing through the fluid control valve.

The diaphragm seal assembly 10 may be installed in a conventional fluid control valve. As mentioned above, the conventional fluid control valve may be a weir type fluid control valve such as commonly used to control the flow of fluids in systems used in the pharmaceutical processing, food processing, beverage processing, and other industries. The diaphragm seal assembly in FIGS. 1 and 2 is illustrated in a closed position and is movable between the closed position and an opened position as further described below.

Referring now to FIGS. 1-5, the attachment stud 11 is a conventional fastener that includes a head 21 and a threaded shank 22. When the seal assembly 10 is installed in a fluid control valve, the shank 22 is threadably connected to a conventional actuator (not shown) of the fluid control valve that moves the diaphragm assembly 10 between its opened and closed positions. The attachment stud 11 is of known one piece steel or stainless steel construction and, as further discussed below, extends from the back side 18 of the diaphragm seal assembly 10.

The reinforcing mesh 12 is preferably a wire mesh that is cut in the shape of a circle with a hole through its center. The threaded shank 22 of the attachment stud 11 extends through the hole in the reinforcing mesh 12, and the head 21 of the attachment stud 11 engages the side of the reinforcing mesh 12 that faces in the first longitudinal direction mentioned above. The reinforcing mesh 12 supports the attachment stud 11, to prevent the attachment stud 11 from being pulled longitudinally out of the elastomeric body 14 in which the attachment stud 11 and reinforcing mesh 12 are embedded when the attachment stud 11 is moved longitudinally in the second direction from its closed position illustrated in FIGS. 1-5 toward its opened position. In its opened position, the elastomeric body 14, the elastomeric film 15, the attachment stud 11 and the reinforcing mesh 12 are all displaced in the second longitudinal direction as further described below.

The rigid carrier 13 is of a high compressive strength metallic material. In the preferred embodiment, the carrier 52 is of United States Society of Automotive Engineers 304 stainless steel material. Alternatively, for some applications, other high compressive strength materials including high strength plastic and carbon composites may be used for the rigid carrier 13. The rigid carrier 13 includes an outer peripheral surface 32 that faces laterally outwardly away from the longitudinal axis 16. An inner peripheral surface 31 of the carrier 13 faces laterally inwardly toward the longitudinal axis 16 and defines a central opening 33 that extends longitudinally through the carrier 13. A first lateral face 35 of the carrier 13 is on the working side 17 of the seal assembly 10. The first lateral face 35 extends laterally between peripheral surfaces 31 and 32 and faces in the first longitudinal direction. A second lateral face 36 of the carrier 13 is on the back side 18 of the seal assembly 10. The second lateral face 36 extends laterally between the peripheral surfaces 31 and 32 and faces in the second longitudinal direction. Bolt holes 37 extend longitudinally through the rigid carrier 13. The bolt holes 37 are arranged in a conventional pattern and receive conventional assembly bolts (not shown) when the diaphragm seal assembly 10 is installed in a fluid control valve.

The rigid carrier 13 also includes 4 corner towers 38 (3 of which may be seen in FIG. 2) and 10 intermediate towers 39 (5 of which may be seen in FIG. 2). The towers 38 and 39 each project longitudinally from the plane of the first lateral face 35 (on the working side 17 of the seal assembly 10) in the first longitudinal direction. The towers 38 and 39 are each disposed between the inner peripheral surface 31 and the outer peripheral surface 32. In the preferred embodiment, the towers 38 and 39 are each located along the substantially laterally outermost portion of the lateral surface 35, substantially at the edge formed by the juncture of the lateral surface 35 and the outer peripheral surface 32. Each tower 38 and 39 includes a laterally inwardly facing surface that faces toward the longitudinal axis 16 and a laterally outwardly facing surface that faces away from the longitudinal axis 16. The laterally outwardly facing surfaces of the towers 38 and 39 are laterally and longitudinally substantially aligned with the outer peripheral surface 32, so that the towers 38 and 39 are each substantially at a maximum lateral distance from the inner peripheral surface 31 and from the longitudinal axis 16. The 4 corner towers 38 are identical to one another and are symmetrically located between each of the bolt holes 37 and the outer peripheral surface 32. Each of the corner towers 38 includes a center curved portion that has a center line substantially coincident with the center line of its adjacent bolt hole 37 and two substantially straight portions that extend from the curved portion in a direction toward the next adjacent corner tower 38. The intermediate towers 39 are arranged along a path extending between adjacent ones of the corner towers 38. The towers 38 and 39 extend peripherally substantially along the laterally outer portion of the surface 35. The towers 38 and 39 are discontinuous and are spaced from one another by openings 40. Each tower 38 and 39 and each opening 40 is substantially identical to a laterally opposite tower 38 or 39 or opening 40, respectively. Each tower 38 and 39 terminates at a control surface 41. Each of the control surfaces 41 is a generally flat lateral surface, disposed in a control plane substantially perpendicular to the longitudinal axis 16. The control surfaces 41 are substantially coplanar, and the control plane in which the control surfaces 41 are disposed is substantially parallel to and longitudinally spaced from the plane of the first lateral surface 35 and the second lateral surface 36. The towers 38 and 39 provides a substantially incompressible spacer that defines a constant and controlled distance between opposing surfaces of the fluid control valve described above and below in which the seal assembly 10 may be installed. Additionally, the rigid carrier 13 prevents laterally outward extrusion of the elastomeric diaphragm body 14.

The elastomeric body 14 is of a suitable thermosetting elastomeric polymeric material such as natural or synthetic rubber. Preferably, this material may be ethylene propylene diene monomer M-class synthetic rubber ("EPDM") that will withstand the temperature and cycle frequency and other requirements of the application, including for example, applicable industry and/or government approvals. For pharmaceutical processing, food processing, or beverage processing requirements, for example, the EPDM material may meet the applicable requirements for Class VI approval by The United States Pharmacopeia (a non-governmental, official public standards-setting authority; see www.usp.org). Additionally, suitable silicone, fluorocarbon, nitrile, and other materials may be selected as well known for the applicable application requirements.

The elastomeric body 14 includes a stationary portion 47 and a diaphragm portion 48 that is carried by the stationary portion 47. The stationary portion 47 substantially encapsulates the inner peripheral surface 31, the outer peripheral surface 32, and the first lateral face 35, including the openings 40 between the towers 38 and 39. The stationary portion 47 also covers the laterally inwardly facing surface and laterally outwardly facing surface of each tower 38 and 39. The stationary portion 47 of the elastomeric body 14 does not, however, cover the control surfaces 41. To assist in bonding the stationary portion 47 to the covered surfaces of the rigid carrier 13, a heat activated bonding agent such as the bonding agent available under the trade name Chemlok may be used. The stationary portion 47 also includes an increased thickness sealing bead 49 that extends substantially around the entire inner peripheral surface 31 and opening 33 of the rigid carrier 13. Locating and handling tabs extend laterally outwardly of the portion of the body stationary portion 47 that covers the outer peripheral portion 32 of the rigid carrier 13 outer peripheral surface The diaphragm portion 48 is disposed laterally inwardly of the seal bead 49 and is arranged for flexing movement between the closed and open positions relative to the stationary portion 47. This movement of the diaphragm portion 47 is caused and controlled by the above described actuator of the fluid control valve in which the seal assembly 10 is installed, acting through the attachment stud 11. An increased thickness seal bead 50 extends across the diaphragm portion 48. The seal beads 50 and 49 each face longitudinally in the first direction and are disposed on the working side 17 of the seal assembly 10. The seal beads 50 and 49 are formed with the relatively more elastic material of the body 13 and are covered with a thin film 15 of relatively less elastic but more chemically resistant material, as described below, rather than forming seal beads with thick beads of thin film material. The typically greater elasticity and lower compression set of the material of the body 13 relative to the material of the film 15 reduces compression set of the beads 50 and 49 relative to forming seal beads with increased thickness portions of the material of the film 15.

Referring to FIGS. 1-6, the elastomeric film 15 is of a chemical resistant, thin, thermoplastic fluoroelastomer material from the polytetrafluoroethylene family of materials. The elastomeric film 15 covers the entire elastomeric body 14, including both the stationary portion 47 and the diaphragm portion 48, with a substantially uniform thickness 54, measured in a direction perpendicular to the exposed surface of the film 15, in the range 0.005 inches to 0.040 inches and preferably about 0.025 inches, to provide adequate resistance to chemical or mechanical degradation while providing adequate flexibility. In the preferred embodiment, this material is available commercially under the brand name Dyneon.

Figure 5:
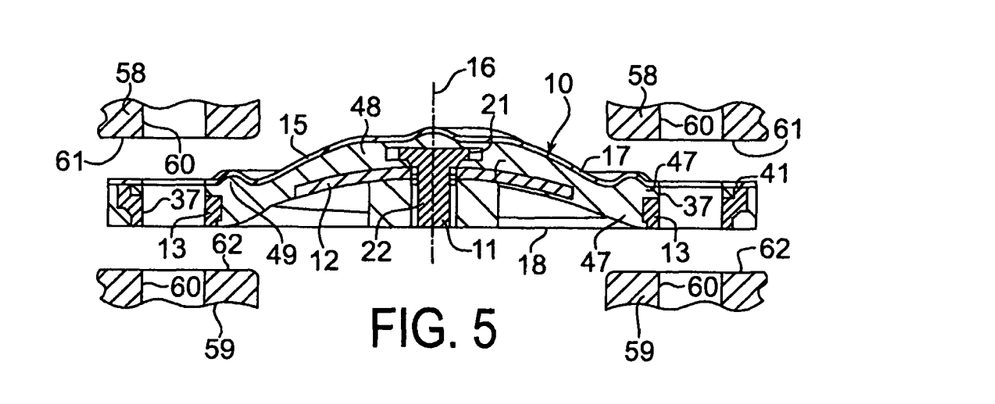
FIG. 5 is a cross sectional view taken along reference view line 5-5 in FIG. 3, with portions of the fluid control valve in which the seal assembly may be installed illustrated diagrammatically.
Figure 6:
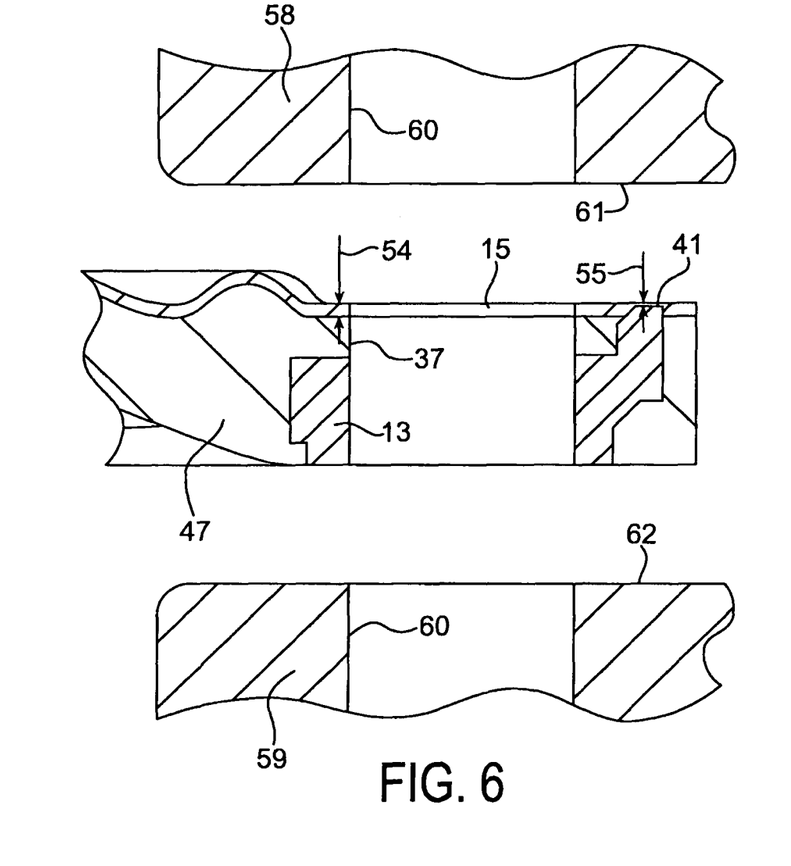
FIG. 6 is a partial view illustrating only the right most portion of FIG. 5, enlarged for clarity.
Figure 7:
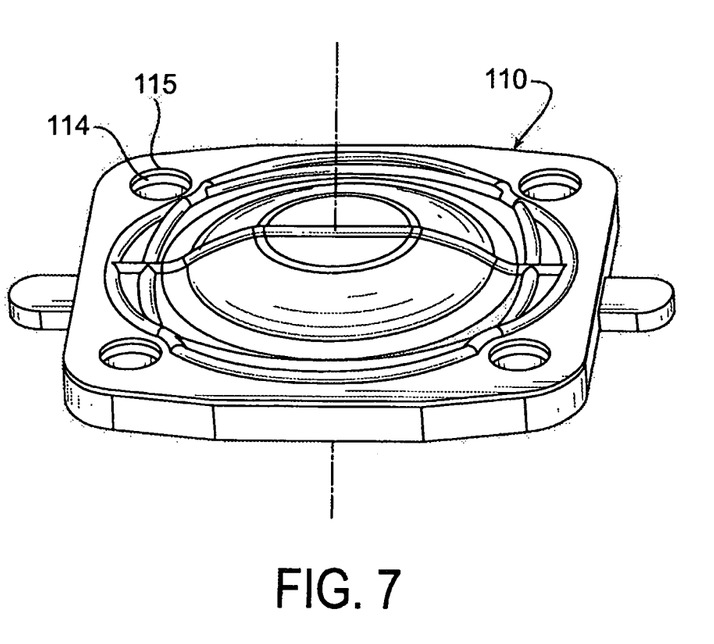
FIG. 7 is a perspective view of a seal assembly, showing another embodiment of the present invention.
Figure 8:
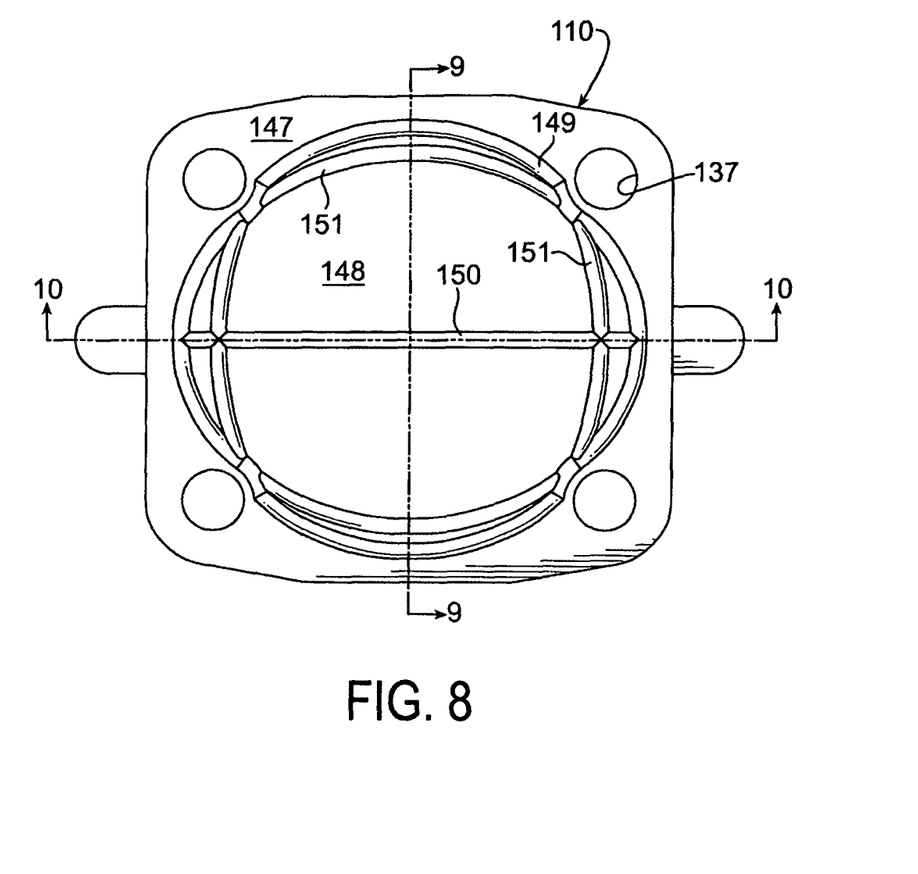
FIG. 8 is a top plan view of the seal assembly shown in FIG. 7.
Figure 9:
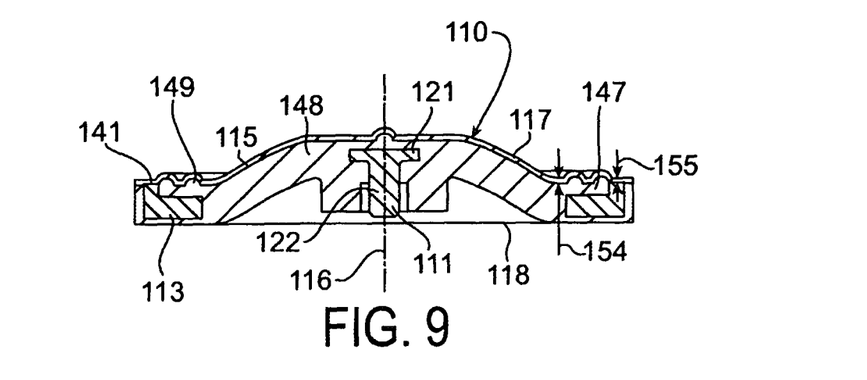
FIG. 9 is a cross sectional view taken along reference view line 9-9 in FIG. 8.
Figure 10:
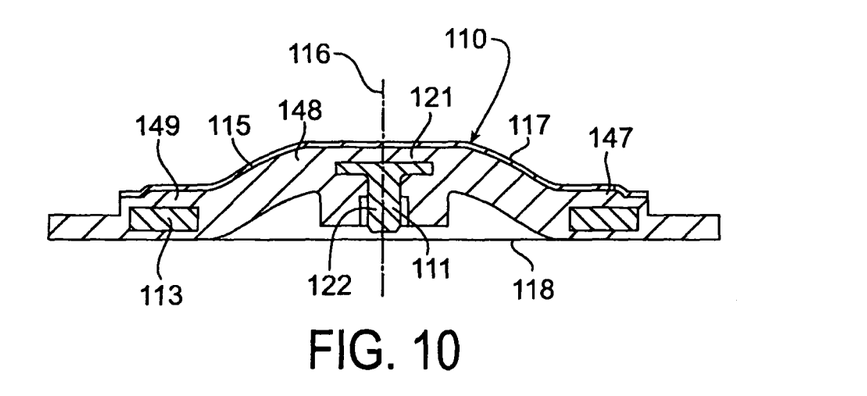
FIG. 10 is a cross sectional view taken along reference view line 10-10 in FIG. 8.

The elastomeric film 15 additionally covers and extends continuously across the entire lateral extent of the control surfaces 41 of the towers 38 and 39, so that the elastomeric film 15 provides a chemically resistant continuous uninterrupted thermoplastic surface for the entire working side 17 of the seal assembly 10. As best shown in FIGS. 5 and 6, the elastomeric film 15 has a reduced substantially uniform thickness 55 measured in a direction perpendicular to its exposed surface at the location of the control surfaces 41. This reduced thickness 55 is substantially less than one half the first or greater thickness 54, and is preferably substantially less than one quarter the first thickness 54. This reduced thickness 55 of the elastomeric film 15 covering the control surfaces 41 is achieved during the manufacturing process described below. The greater thickness 54 of the elastomeric film 15 allows the elastomeric film 15 to be thicker at the locations of the stationary portion 47 with seal bead 49 and at the location of the diaphragm portion 48 with seal bead 50 for longevity. The reduced thickness 55 reduces potential compressibility of the thickness 55 covering the control surfaces 41 during installation of the seal assembly 10 in its associated fluid control valve, as further described below. The thicknesses 54 and 55 illustrated in the drawings are increased in proportion to the other portions of the seal assembly 10, so that the relationship of the thicknesses 54 and 55 can be illustrated.

Referring still to FIGS. 5 and 6, the seal assembly 10 may be installed in a known fluid control valve that includes a first known fluid control valve portion (a part of which is illustrated diagrammatically in FIGS. 5 and 6 by reference number 58), and a second known fluid control valve portion (a part of which is illustrated diagrammatically in FIGS. 5 and 6 by reference number 59). The valve portions 58 and 59 each include four bolt holes 60 (two of which are illustrated in FIGS. 5 and 6) aligned with bolt holes 37 of the valve assembly 10. The valve portions 58 and 59 also include surfaces 61 and 62, respectively, that are arranged in a plane substantially parallel with the plane in which the control surfaces 41 are disposed and that cooperatively engage the seal assembly 10. Bolts (not shown) extend through the aligned bolt holes 60 and 37, and the bolts are tightened to bias the surface 61 against the working side 17 of the seal assembly 10 and to bias the surface 62 against the back side 18 of the seal assembly 10. As the bolts are tightened, the surface 61 on the working side 17 firmly engages the control surfaces 41 of the rigid carrier 13 and sealingly engages and compresses the stationary seal bead 49. As this occurs, the surface 62 on the back side 18 firmly engages the back side portion of the rigid carrier 13. In this position, the engagement of the surfaces 61 and 62 against the control surfaces 61 of the rigid carrier 13 and against the back side portion of the rigid carrier 13 causes the torque required to further tighten the bolts to increase significantly. This signals that the bolts are fully tightened and that the seal bead 49 is sealingly compressed against the surface 61. The amount of this compression is determined by the uncompressed height of the bead 49 relative to the height of the control surfaces 41. Since the thickness 55 of the elastomeric film 15 extending over the control surfaces 41 of the towers 38 and 39 is substantially reduced relative to the thickness 55, the thickness 55 may be considered negligible during the tightening of the bolts. The bolts are torque to a predetermined torque value against the substantially incompressible rigid carrier 13, and this torque may not materially change over the duration of operation of the seal assembly 10, to substantially eliminate the need to retighten the bolts due to compression set characteristics of the elastomeric body 14 or of the elastomeric film 15. Additionally, over compression or under compression of the seal bead 49 may be minimized or reduced or eliminated. This may increase the length of service of the seal assembly 10 between required replacements.

The method of manufacturing the seal assembly 10 includes stamping or cutting or casting or otherwise forming the rigid carrier 13. The carrier portion 13, attachment stud 11 and reinforcing mesh 12 are placed in a mold apparatus (not shown) that may include a mold cavity defined by a top mold segment (not shown) and a bottom mold segment (not shown) when the mold segments are opened. Additionally, material for the elastomeric body 14 may be placed on each side of the mesh 12. A sheet of uniform thickness 54 for the elastomeric film 55 may be placed on the side of the other materials that will become the working side 17 of the seal assembly 10. A bonding agent may be applied between the material for the body 14 and the film 15 and the material for the body 14 and the carrier 13. The mold is then closed and heated to compression mold the seal assembly 10. The thin film 15 may be fully adhered to the body 14 to eliminate rubbing or chafing between the film 15 and the body 14. Additionally, when the mold is closed, the known high mold compressive force is applied against the back side of the rigid carrier 13 and against the control surfaces 41 of the towers 38 and 39. The high force of the mold segment acting against the control surfaces 41 reduces the thickness of the film 15 that covers the control surfaces from thickness 54 to thickness 55. After curing the synthetic rubber material of the body 14, the mold is opened and the seal assembly is removed. Material of the film 15 at the location of the bolt holes 37 and any other excess material is removed, and the seal assembly 10 is completed.

Referring now to FIGS. 7-10, an alternate embodiment of the present invention is illustrated. Reference numbers used to describe the embodiment of FIGS. 1-6 are used with respect to the alternate embodiment, with the addition of a prefix numeral 1. The description above relating to the embodiment of FIGS. 1-6, including the method of manufacture and installation, is generally applicable to the alternate embodiment seal assembly 110, except as otherwise illustrated or described. The seal assembly 110 does not use a reinforcing mesh. The rigid carrier 113 is of slightly different cross section, but includes an inner peripheral surface similar to surface 31 and an outer peripheral surface similar to surface 32 and a central opening similar to opening 33. The rigid carrier 113 also includes a first lateral face similar to face 35 and a second lateral face similar to face 36 and bolt holes similar to bolt holes 37. The rigid carrier 113 includes corner towers substantially identical to corner towers 38 and intermediate towers substantially identical to towers 39 and openings substantially identical to openings 40 and control surfaces substantially identical to control surfaces 41. The elastomeric body 114 includes a second stationary seal bead 151. The elastomeric body 114 does not cover the bolt holes 137.

Presently preferred embodiments of the invention are shown in the drawings and described in detail above. The invention is not, however, limited to these specific embodiments. Various changes and modifications can be made to this invention without departing from its teachings, and the scope of this invention is defined by the claims set out below.

What is claimed is:

1. A seal assembly comprising:
   a rigid carrier;
   an elastomeric body;
   an elastomeric film;
   said carrier, said body and said film each having a longitudinal axis and being coaxial with the other;
   said carrier including an outer peripheral surface facing outwardly from said longitudinal axis, an inner peripheral surface facing inwardly toward said longitudinal axis and defining a central opening extending longitudinally through said carrier, a lateral carrier surface facing longitudinally in a first longitudinal direction and extending laterally between said outer peripheral surface and said inner peripheral surface, a plurality of towers each extending longitudinally in said first direction from said lateral carrier surface and terminating at a lateral control surface facing longitudinally in said first direction;
   said elastomeric body including a stationary portion and a diaphragm portion, said stationary portion being generally laterally coextensive with said lateral carrier surface between said inner peripheral surface and outer peripheral surface, said diaphragm portion being generally laterally coextensive with said opening, said body having a working surface facing in said first longitudinal direction; and said film being adhered to and being generally laterally coextensive with said body working surface; and wherein said film has a diaphragm portion covering the diaphragm portion of said elastomeric body, and said film has reduced thickness portions that cover said control surfaces of respective said towers, and said reduced thickness portions have a thickness less than thickness of said diaphragm portion of said film.

2. The seal assembly of claim 1 wherein said carrier includes a plurality of longitudinally extending through holes laterally intermediate said inner peripheral surface and said outer peripheral surface.

3. The seal assembly of claim 2 wherein at least one of said towers is disposed laterally outwardly of at least one of said through holes.

4. The seal assembly of claim 1 wherein said towers are disposed substantially adjacent said outer peripheral surface.

5. The seal assembly of claim 4 wherein said carrier lateral surface includes a laterally extending opening between adjacent ones of said towers.

6. The seal assembly of claim 4 wherein said stationary portion is discontinuous at the location of each of said towers.

7. The seal assembly of claim 4 including an attachment stud, said attachment stud includes an enlarged diameter head portion, and said head portion is substantially embedded in said diaphragm portion of said body at the location of said longitudinal axis.

8. The seal assembly of claim 7 including a reinforcing web, said reinforcing web being embedded in said diaphragm portion of said body, said reinforcing web being longitudinally aligned with the head portion, and said head portion being longitudinally intermediate said reinforcing web and said working surface of said body.

9. The seal assembly of claim 4 wherein said towers each include a laterally inwardly facing surface that faces toward said longitudinal axis and a laterally outwardly facing surface that faces away from said longitudinal axis, said laterally outwardly facing surfaces of said towers being laterally and longitudinally substantially aligned with said outer peripheral.

10. The seal assembly of claim 1 wherein reduced thickness portions of said film have a thickness less than half the thickness of said diaphragm portion of said film.

11. The seal assembly of claim 10 wherein said body is a thermosetting material and said film is a thermoplastic material.

12. The seal assembly of claim 11 wherein said film includes a working surface facing said first longitudinal direction, and the thickness of said film measured in a direction perpendicular to said film working surface is substantially uniform at all locations at which said film is adhered to said diaphragm portion of said body.

13. The seal assembly of claim 12 wherein said thickness is in the range of 0.010 inch to 0.040 inch.

14. The seal assembly of claim 12 wherein said reduced thickness portions are substantially uniform in thickness.

15. The seal assembly of claim 14 wherein said reduced thickness portions have a thickness less than one quarter the thickness of said diaphragm portion of said film.

16. The seal assembly of claim 1 wherein said body includes a continuous seal bead substantially at the location of and aligned with said inner peripheral surface.

17. The seal assembly of claim 16 wherein said film includes a working surface facing said first longitudinal direction, and the thickness of said film measured in a direction perpendicular to said film working surface is substantially uniform at all locations at which said film is adhered to said body.

18. The seal assembly of claim 17 wherein said thickness is in the range of 0.010 inch to 0.040 inch.

19. The seal assembly of claim 16 wherein reduced thickness portions are substantially uniform in thickness.

20. The seal assembly of claim 19 wherein said reduced thickness portions have a thickness less than one quarter the thickness of said diaphragm portion of said film.

21. The seal assembly of claim 16 wherein said film working surface at the location of said stationary body portion laterally outwardly of said seal bead and at the location of said tower control surfaces is disposed in a single plane generally perpendicular to said longitudinal axis.

22. The seal assembly of 16 further including a fluid control valve having opposed surfaces acting against said control surfaces of said towers and a side of said seal assembly facing in said second longitudinal direction.

23. A seal assembly comprising:
a rigid carrier;
an elastomeric body;
an elastomeric film;
said carrier, said body and said film each having a longitudinal axis and being coaxial with the other;
said carrier including an outer peripheral surface facing outwardly from said longitudinal axis, an inner peripheral surface facing inwardly toward said longitudinal axis and defining a central opening extending longitudinally through said carrier, a lateral carrier surface facing longitudinally in a first longitudinal direction and extending laterally between said outer peripheral surface and said inner peripheral surface, a plurality of towers each extending longitudinally in said first direction from said lateral carrier surface and terminating at a lateral control surface facing longitudinally in said first direction;
said elastomeric body including a stationary portion and a diaphragm portion, said stationary portion being generally laterally coextensive with said lateral carrier surface between said inner peripheral surface and outer peripheral surface, said diaphragm portion being generally laterally coextensive with said opening, said body having a working surface facing in said first longitudinal direction;
said film being adhered to and being generally laterally coextensive with said body working surface; and
wherein said towers are disposed substantially adjacent said outer peripheral surface;
wherein said towers each include a laterally inwardly facing surface that faces toward said longitudinal axis and a laterally outwardly facing surface that faces away from said longitudinal axis, said laterally outwardly facing surfaces of said towers being laterally and longitudinally substantially aligned with said outer peripheral surface; and
wherein said carrier includes a laterally facing opening between adjacent ones of said control towers, said stationary portion of said body substantially encapsulates said inner peripheral surface and said lateral face of said carrier including said openings, and said stationary portion also substantially encapsulates said laterally inwardly facing surface of said towers.

24. A seal assembly comprising:
a rigid carrier;
an elastomeric body;
an elastomeric film;
said carrier, said body and said film each having a longitudinal axis and being coaxial with the other;
said carrier including an outer peripheral surface facing outwardly from said longitudinal axis, an inner peripheral surface facing inwardly toward said longitudinal axis and defining a central opening extending longitudinally through said carrier, a lateral carrier surface facing longitudinally in a first longitudinal direction and extending laterally between said outer peripheral surface and said inner peripheral surface, a plurality of towers each extending longitudinally in said first direction from said lateral carrier surface and terminating at a lateral control surface facing longitudinally in said first direction;
said elastomeric body including a stationary portion and a diaphragm portion, said stationary portion being generally laterally coextensive with said lateral carrier surface between said inner peripheral surface and outer peripheral surface, said diaphragm portion being generally laterally coextensive with said opening, said body having a working surface facing in said first longitudinal direction;
said film being adhered to and being generally lateral coextensive with said body working surface; and
wherein said towers are disposed substantially adjacent said outer peripheral surface; and
wherein each of said towers that is disposed laterally outwardly of said through holes includes a center curved portion having a center line substantially coincident with a center line of its adjacent through hole and two substantially straight portions that extend from said curved portion in a direction toward a next adjacent tower, other said towers are arranged along a path extending between adjacent ones of said towers disposed laterally outwardly of said holes, and said towers are discontinuous and are spaced from one another by lateral openings.

25. A seal assembly comprising:
a rigid carrier;
an elastomeric body;
an elastomeric film;
said carrier, said body and said film each having a longitudinal axis and being coaxial with the other;
said carrier including an outer peripheral surface facing outwardly from said longitudinal axis, said outer peripheral surface including a plurality of rounded corners and a plurality of connecting surfaces between adjacent ones of said corners, an inner peripheral surface facing inwardly toward said longitudinal axis and defining a central opening extending longitudinally through said carrier, a first lateral carrier surface facing longitudinally in a first longitudinal direction and extending laterally between said outer peripheral surface and said inner peripheral surface, a second lateral carrier surface generally parallel to said first surface, said second surface facing longitudinally in a second direction opposite said first direction and extending laterally between said outer peripheral surface and said inner peripheral surface, a plurality of towers each extending longitudinally in said first direction from said first lateral carrier surface and terminating at a lateral control surface facing longitudinally in said first direction, a longitudinally extending through hole disposed laterally intermediate said inner peripheral surface and said outer peripheral surface at the location of each of said corners, at least one of said towers being disposed laterally outwardly of each of said through holes and substantially adjacent said outer peripheral surface, at least one of said towers being disposed substantially adjacent each of said connecting surfaces of said outer peripheral surface, a laterally extending opening between adjacent ones of said towers,
said elastomeric body including a stationary portion and a diaphragm portion, said stationary portion being generally laterally coextensive with said first lateral carrier surface between said inner peripheral surface and outer peripheral surface, said diaphragm portion being generally laterally coextensive with said opening, said body having a working surface facing in said first longitudinal direction, said stationary portion being discontinuous at and terminating at the location of said towers;
said film being adhered to and being generally laterally coextensive with said body working surface; and
wherein said film has a diaphragm portion covering the diaphragm portion of said elastomeric body, and said film has reduced thickness portions that cover said control surfaces of respective said towers, and said reduced thickness portions have a thickness less than thickness of said diaphragm portion of said film.

26. The seal assembly of claim 25 wherein said body is a thermosetting material and said film is a thermoplastic material, said film includes a working surface facing said first longitudinal direction, and the thickness of said film measured in a direction perpendicular to said film working surface is substantially uniform at all locations at which said film is adhered to said body except at the reduced thickness portions.

27. The seal assembly of claim 26 wherein said thickness of said reduced thickness portions is substantially less than said thickness of said film at locations at which said film is adhered to said diaphragm portion of said body.

* * * * *